Patented Mar. 16, 1937

2,073,997

UNITED STATES PATENT OFFICE 2,073,997

ALKYL α-NAPHTHOLS

George W. Raiziss and Le Roy W. Clemence, Philadelphia, Pa., assignors to Abbott Laboratories, North Chicago, Ill., a corporation of Illinois No Drawing. Application January 28, 1935, Serial No. 3,809

5 Claims. (Cl. 260—154)

Our invention relates to a group of compounds which we have prepared and, so far as we know, have not previously been produced, which compounds we find are of high value as bactericidal and bacteriostatic agents. Said compounds are particularly strong in germicidal effect towards *Staphylococcus aureus*, which property is of importance in the treatment of infectious diseases. These compounds, furthermore, are of comparatively low toxicity and are, therefore, suitable for general purposes of disinfection.

The compounds which we have prepared and which we consider new may be classed as alkyl derivatives of α-naphthol, wherein the alkyl chain contains 4, 5, and 6-carbon atoms.

The various alkyl naphthols which we have prepared and investigated and which are listed below may all be prepared by the type method, hereinafter described, and have all been found to have the highly advantageous properties above referred to.

The various compounds are all viscous oils, colorless to pale yellow, insoluble in water, soluble in organic solvents, and generally soluble in dilute alkali, with exceptions as noted below.

The following is illustrative of the method used in preparing these substances:

(1-ethyl-propyl)-α-naphthol

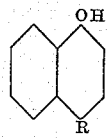

144 grams of α-naphthol, 250 grams of zinc chloride and 180 grams of dethyl carbinol are heated together, with stirring, under reflux condenser. The temperature of the reaction mixture gradually rises to 145°. After two hours, a layer separates and heating is continued for two and a half hours longer, the temperature rising to 170°. Allow to cool and pour into one liter of water containing a little hydrochloric acid. An oily layer separates and is washed with water. The oil is then extracted with 1500 cc. H₂O containing 110 cc. of 40 per cent sodium hydroxide and allowed to stand for several hours until the layers separate clearly. The insoluble oil is separated; and the alkaline solution washed several times with petroleum ether. The clear alkaline extract is then acidified with hydrochloric acid. The oil which separates is extracted with ether and dried over anhydrous sodium sulfate. After eight hours it is filtered from the sulfate, the ether distilled off and the resulting oil fractionally distilled in vacuum.

*Fraction A.*—B. P. 175°–180° C., 11 mm., 47 gm. distils as an oil,—solidifies. Melting point 94°. This is unchanged α-naphthol.

*Fraction B.*—B. P. 210°–220° C., 13 mm., 55.5 gm.

A colorless viscous oil, insoluble in water, soluble in organic solvents; soluble in dilute alkali. This is (1-ethyl-propyl)-α-naphthol.

The various other compounds listed below may be made by substantially the same procedure, substituting the appropriate alcohol.

| | B. P. | Pressure | Solubility in alkali |
|---|---|---|---|
| *Butyl derivatives* | deg. | mm. | |
| N-butyl α-naphthol | 184–198 | 9 | Insoluble. |
| Iso-butyl α-naphthol | 180–185 | 8 | Soluble. |
| Secondary-butyl α-naphthol | 185–193 | 9 | Do. |
| Tertiary-butyl α-naphthol | 186–195 | 10 | Do. |
| *Amyl derivatives* | | | |
| N-amyl-α-naphthol | 205–215 | 7 | Do. |
| Iso-amyl-α-naphthol | 225–230 | 10 | Insoluble. |
| (1-ethyl-propyl)-α-naphthol | 210–220 | 7 | Soluble. |
| (1-methyl-butyl)-α-naphthol | 180–190 | 12 | Do. |
| (2-methyl-butyl)-α-naphthol | 205–220 | 7 | Insoluble. |
| Tertiary-amyl-α-naphthol | 186–195 | 9 | Soluble. |
| *Hexyl derivatives* | | | |
| (Methyl-amyl)-α-naphthol | 185–200 | 6 | Insoluble. |
| (Ethyl-butyl)-α-naphthol | 205–225 | 7 | Do. |

We claim as our invention:

1. An alkyl derivative of an α-naphthol, wherein the alkyl group contains from 4 to 6 carbon atoms.

2. A compound having the formula:

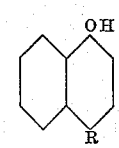

wherein R is an alkyl group having from 4 to 6 carbon atoms.

3. (1-ethyl-propyl)-α-naphthol.
4. (1-methyl-butyl)-α-naphthol.
5. n-Amyl-α-naphthol.

GEORGE W. RAIZISS.
LE ROY W. CLEMENCE.